United States Patent [19]

Spitzer et al.

[11] 3,912,665

[45] *Oct. 14, 1975

[54] EMULSIFIED PROPELLANT COMPOSITIONS FOR FOAMED STRUCTURES SUCH AS APPLICATOR PADS, AND PROCESS

[76] Inventors: Joseph George Spitzer, 722 Cove Road East, Mamaroneck, N.Y. 10543; Marvin Small, 1100 Park Ave., New York, N.Y. 10028; Lloyd I. Osipow, 2 Fifth Ave., New York, N.Y. 10011; Dorothea C. Marra, 107 Fernwood Raod, Summit, N.J. 07901

[ * ] Notice: The portion of the term of this patent subsequent to Oct. 14, 1992, has been disclaimed.

[22] Filed: Jan. 17, 1973

[21] Appl. No.: 324,472

Related U.S. Application Data

[63] Continuation-in-part of Ser. No. 166,960, July 28, 1971, abandoned, and a continuation-in-part of Ser. No. 5,150, Jan. 22, 1970, abandoned, and a continuation-in-part of Ser. No. 797,257, Feb. 6, 1969, abandoned.

[52] U.S. Cl. ................ 260/2.5 E; 52/298; 106/122; 106/170; 128/260; 128/272; 132/87.7; 132/DIG. 3; 260/2.5 L; 260/2.5 AF; 260/2.5 AK; 260/2.5 HA; 260/2.5 N; 260/9 R; 260/13; 264/53; 264/DIG. 16; 264/DIG. 17; 424/68; 424/70; 260/17 R; 260/17.4 BB; 260/17.4 R; 260/17.4 ST; 260/18 TN; 260/18 S; 260/22 R; 260/23 H; 260/23 S; 260/23 R; 260/23 P; 260/28.5 R; 260/29.2 M; 260/29.2 TN; 260/29.6 H; 260/29.6 ME; 260/29.6 MH; 260/29.6 MN; 260/29.6 MQ; 260/29.6 MP; 260/29.6 T; 260/29.6 XA; 260/29.6 GP; 260/29.7 X; 260/30.6 R; 260/31.8 DR; 260/31.8 H; 260/31.8 PA; 260/31.8 R; 260/31.8 S; 260/31.8 XA; 260/33.6 PQ; 260/33.6 R; 260/33.6 SB; 260/33.6 UA; 260/33.6 UB; 260/37 SB; 260/37 N; 260/40 K; 260/42.37; 260/42.52; 260/33.4 PQ; 260/33.4 SB; 260/33.4 UR; 260/897 R

[51] Int. Cl.² ........ C08J 9/12; C08J 9/26; C08J 9/30
[58] Field of Search ....... 260/2.5 L, 2.5 E, 29.6 PM, 260/29.6 MH; 106/170, 122

[56] References Cited
UNITED STATES PATENTS

| | | | |
|---|---|---|---|
| 3,419,506 | 12/1968 | Gander | 260/2.5 E |
| 3,640,916 | 2/1972 | Dill | 260/2.5 L |
| 3,705,669 | 12/1972 | Cox et al. | 260/2.5 L |

*Primary Examiner*—Morton Foelak

[57] ABSTRACT

Foam structures such as applicator pads for cleaning and other purposes are provided, that are formed from emulsified propellant compositions including a synthetic polymer in solution in a low boiling propellant and dispersed or emulsified in an organic liquid as the continuous phase. Such compositions quickly form foamed structures containing open and/or closed cells at atmospheric temperature and pressure. The structures and propellant compositions can include a material which is deposited in the pores and/or cells of the structure together wit the organic liquid as the structure is formed, and which can be removed from the structure when desired. These structures are particularly suitable for use as applicator pads having a porous surface with a high proportion of open area, with a material such as a cosmetic, pharmaceutical, detergent, anti-microbial agent or abrasive which is contained in the pores thereof, and which can be removed.

The emulsified propellant compositions are stored in closed containers capable of withstanding an internal pressure sufficient to keep the propellant in the liquid phase at atmospheric temperature, and when the composition is withdrawn from the container to atmospheric pressure, the propellant volatilizes rapidly, and the foamed structure is formed within a few seconds.

30 Claims, No Drawings

EMULSIFIED PROPELLANT COMPOSITIONS FOR FOAMED STRUCTURES SUCH AS APPLICATOR PADS, AND PROCESS

This application is a continuation-in-part of Ser. No. 166,960 filed July 28, 1971, now abandoned Ser. No. 5150 filed Jan. 22, 1970, now abandoned and Ser. No. 797,257 filed Feb. 6, 1969, now abandoned.

A propellant is defined by the Chemical Specialties Manufacturers' Association as a liquefied gas with a vapor pressure greater than atmospheric pressure at a temperature of 105°F. A large class of organic compounds falls in this category, of which some are hydrocarbons, but most are halogenated hydrocarbons having one or two carbon atoms, and one or more chlorine, fluorine or bromine atoms. Frequently different halogens are substituted in the same molecule to impart the desired vapor pressure.

Because of their high volatility, propellants have been used as pore-forming agents in the production of plastic foams for many years. Propellants are soluble in many synthetic resins, and accordingly can be absorbed in the solid resin, which is desirably in particulate form, after which the resin containing the absorbed propellant is subjected to heat and pressure. The propellant vaporizes, and a closed cell foam structure is formed. U.S. Pat. No. 3,335,101 shows application of this process to the production of foams of chlorinated polyethylene. U.S. Pats. Nos. 2,387,730, 2,948,665, and 3,351,569 foam polyethylene and polypropylene in this way, U.S. Pat. No. 3,160,688 foams polystyrene, U.S. Pat. No. 3,352,802 foams polyvinyl chloride, U.S. Pat. No. 3,253,967 foams polyoxymethylene, and U.S. Pat. No 3,310,617 foams a variety of thermoplastic resins by a similar but modified process intended to ensure that the propellant is uniformly dissolved or dispersed in the molten resin, so as to overcome the poor mixing problems of prior procedures.

In these procedures the amounts of propellants used are rather small, because only small amounts of the propellant can be absorbed in the solid resin, and the resin is molten, to facilitate foaming of the structure when the propellant is volatilized in situ to form the cells. The resin is then allowed to solidify before the structure can collapse, so as to preserve the foamed nature.

Randa, U.S. Pat. No. 3,072,583, patented Jan. 8, 1963, prepares foamed articles by extruding a perfluorocarbon resin in molten form, and containing from 0.1% to 5% by weight of fluoromethane. The fluoromethane dissolves in the resin at atmospheric pressure and room temperature, and is volatilized under the extrusion conditions so as to produce a foamed structure. This procedure is useful for coating wire with a foamed coating.

Raley and Skochdopole, U.S. Pat. No. 3,379,802, patented Apr. 23, 1968, describe a similar procedure for aliphatic olefin polymer blends, and U.S. Pat. No. 3,067,147 makescellular polyethylene using 1,2-dichloro-1,1,2,2,-tetrafluoroethane.

It has also been proposed that ultramicrocellular fibers be prepared with the aid of propellants. Blades and White, U.S. Pat. Nos. 3,227,664 and 3,227,784, patented Jan. 4, 1966, describe a flash extrusion process for this purpose. Supple, ultramicrocellular shaped structures are obtained from synthetic organic crystalline polymers by heating a confined mixture of the polymer plus at least one activating liquid at a temperature and pressure at which a homogeneous solutin is formed, the temperature being greater than the normal boiling point of the liquid. This solutin is then extruded abruptly to a region of substantially lower pressure and temperature under such conditions that a very large number of bubble nuclei exist at the extrusion orifice. Vaporization of the activating liquid rapidly cools the solution to the temperature at which the polymer precipitates and freezes in the polymer orientation produced in the rapid extrusion and expansion process.

The activating liquids must meet a number of requirements, of which one of the most noteworthy is that the liquid should dissolve less than 1% of the polymeric material at or below its boiling point. In other words, it is a nonsolvent for the polymer at or below its boiling point, but a solvent for the polymer under the extrusion conditions. To provide bubble nuclei at the instant of extrusion, a particulate solid nucleating agent can be incorporated in the polymer solution. Silica aerogel is a suitable nucleating agent. The result is a structure having extremely small closed cells. Modifications of this process are described in U.S. Pat. Nos. 3,081,519 to Blades et al., dated Mar. 19, 1963, 3,375,211 and 3,384,531 to Parrish, dated Mar. 26, 1968 and May 21, 1968, 3,375,212 to Bonner, issued Mar. 26, 1968, 3,461,193 to Gilardi, dated Aug. 12, 1969, and 3,467,744 to Woodell, dated Sept. 16, 1969.

Certain synthetic resins are soluble in propellants at room temperature. Bunting, U.S. Pat. No. 2,716,637, patented 1955, pointed out that when such solutions are volatilized quickly, fine bubbles of plastic resin are obtained, which initially retain sufficient solvent so as to possess a surface tackiness, but as the solvent continues to escape from the globules, they blister and acquire an unsatisfactory appearance. Bunting avoids this by combining a fatty acid with the resin propellant solution, and keeps the resin content of the soltion rather low, within the range from 5 to about 12%. Similar compositions are described by Hochberg and Pellerano, U.S. Pat. No. 2,773,855, patented Dec. 11, 1956, and these workers point out that the particles obtained are in the form of small, hollow or solid semispheres ranging from 1/16 or ¼ inch in largest dimension. Coherent foamed masses are not obtained.

Gardner, U.S. Pat. No. 3,419,506, patented Dec. 31, 1968, prepares a protective film covering or dressing for wounds by dispensing from a pressurized container a composition comprising a film-forming vinyl acetate polymer or alkyl acrylate polymer, from 10 to 50% by weight based on the solids of a finely-divided filler, and a propellant, the solution having a viscosity of at least 1000 cp at normal room temperature. The inert filler must be present in order to obtain satisfactory foamed application of the film-forming resin, according to Gander, the filler perhaps serving as a nucleating agent, as described by Blades et al. in Pat. Nos. 3,227,784 and 3,227,664, and rather thin, tacky films are obtained, several mils in thickness.

In accordance with the invention of Ser. No. 5,150, structures such as applicator pads are provided, that are formed from propellant compositions including a film-forming synthetic polymer in solution in the propellant. Such compositions at atmospheric temperature and pressure form coherent, voluminous foamed structures, composed of a matrix of the synthetic polymer containing open or closed cells or both, in any desired proportion. The composition can include an additive which is deposited in the cells and/or walls (i.e., the polymer marix) of the structure when the propellant volatilizes, and may exude or bleed from the structure, or may be expressed therefrom. Thus, the foamed structures of that invention have utility as applicator pads for a variety of materials, such as antimicrobial agents including bactericides and fungicides, cosmetics, detergents and other cleansing agents, antibiotics, astringents, and various types of medicaments.

The propellant compositions of the invention of Ser. No. 5,150 also are useful with or without the additive to form molded structures, which can be molded in open or closed molds under autogenous pressure at atmospheric temperature into a varietyof shaped foamed structures.

The invention of Ser. No. 5,150 also provides a process for forming foamed structures from propellant compositions of this type, which makes it possible to control the relative proportions of open and closed cells in the resulting structure.

The propellant compositions in accordance with the invention of Ser. No. 5,150 comprise a film-forming synthetic resin in solution in a propellant having a boiling point below 45°F. at atmospheric pressure. The additive that may subsequently be disposed in the cells and/or walls of the foamed structure can be in solution in the propellant, or dispersed in the propellant, or in solution or in dispersion in a separate liquid phase that is itself dispersed inthe propellant phase of the composition. Thus, the propellant compositions of that invention can be solutions or water-in-oil emulsions in which the propellant is the solvent in the continuous phase and another liquid or liquid composition or solid is dispersed therein in a discontinuous phase. Since the propellant boils at a temperature below 45°F., it is of course a vapor at room temperature and pressure. Consequently, the propellant compositions of the invention are stored in closed containers capable of withstanding the pressure of the propellant, so as to maintain the propellant in the liquid phase. When the composition is ejected from the container to atmospheric pressure at atmospheric (room) temperature, the propellant is rapidly volatilized, and a coherent foamed structure is formed, with the additive in the cells and/or walls.

In accordance with the invention of Ser. No. 166,960, emulsified compositions of the oil-in-water type, in which water is the continuous phase, and the solution of synthetic polymer in a propellant is the discontinuous phase, are provided, that can be foamed to produce porous structures having a high proportion of open pores, if the aqueous phase includes a foaming agent or foam-stabilizing agent. The porous structures comprise interconnected cells or pores which extend throughout the structure, and have a material which is contained in the pores thereof, and which can be removed.

It has been determined, in accordance with the instant invention, that an organic liquid that also may comprise a foaming agent or foam-stabilizing agent can serve as the continuous or dispersing phase for a solution consisting essentially of a poymer dissolved in liquefied propellant, which is a foaming agent. The organic liquid is present in an amount greater than its solubility in the polymer propellant phase. In the case of water-soluble organic liquids, a minor amount of water may be added to reduce its solubility in the polymer propellant phase, and thus ensure the presence of an organic liquid phase. The organic liquid is a liquid at atmospheric temperature and pressure, whereas the propellant is a gas under these conditions. Thus, when the pressurized composition packaged ina container is expelled through a valve into the atmosphere, the liquefied propellant immediately volatilizes, and foams the propellant phase, causing it to expand and the polymer to precipitate, resulting in the foamed structure, with the organic liquid phase in the foam cells thereof.

The organic liquid used in forming the continuous phase of the emulsion can be a good or a poor solvent for the propellant, and the propellant can be present in that phase to a minor or to an appreciable extent. When thepropellant is present in the organic liquid phase to an appreciable extent, say more than about 10%, it will act as a foaming agent for that phase. Even when it is present to only a minor extent in that phase, however, a part and perhaps even a major proportion of the propellant that volatilizes will nonetheless also serve to foam the organic liquid phase. It is believed that if this occurs, it is by the following mechanism, but this is offered merely by way of explanation, since it has not been confirmed by unequivocal experimental evidence.

The propellant containing dissolved polymer is initially present as dispersed droplets in the organic liquid phase. As propellant volatilizes in the propellant phase to form a gas bubble surrounded by a film of polymer, propellant gas within the film can escape as readily from the outside of the film into the organic liquid phase as from the inside of the film into the gas bubble. Further, since there is a greater concentration of propellant gas within the gas bubble surrounded by the film of polymer than in the organic liquid phase, there is constant diffusion of propellant gas from the interior of the bubble into the liquid phase. These bubbles of propellant gas foam the liquid phase. If the liquid foam is very stable, the liquid phase foam voume may well be greater than the foam volume of polymer from the propellant phase of the emulsion. On the other hand, if the liquid foam is quite unstable, it will tend to collapse as it is being formed, and the volume of the plastic foam may be the greater.

Control of the relative foaming tendencies and foam volume of the organic liquid andpropellant phases makes it possible to obtain a coherent resinous foamed structure, with the liquid phase in the pores and/or cells thereof. If the proportion of liquid phase and liquid foam volume is too high, and/or if the liquid foam is too stable, a coherent foamed structure will not be obtained. Instead, the foamed resin will precipitate or disintegrate into foamed particles. The same result is obtained if the polymer is hard and brittle. To obtain a coherent foamed structure, the propellant phase has to be present in a sufficient amount to permit the polymer precipitated from the dispersed propellant phase droplets to unite and cohere during the foaming, and enclose the liquid phase within the open pores and/or cells of the polymer structure. Usually this occurs if the foam volume of the polymer propellant phase is approximtely equal to or is up to three times greater than the foam volume of the liquid phase. The polymer itself must also be soft and cohesive, but a hard polymer can be plasticized by temporary or permanent plasticizers to bring it to this condition.

It is not possible to establish precise and well-defined limits for the proportions of liquid phase and polymer-propellant phase, because the type and amount of foaming agent or foam stabilizing agent in the liquid phase and propellant (foaming aent) in both phases also play a part. The type of polymer and its degree of plasticization are also factors. Knowing the effects of these factors, in keeping with the principles outlined above, it is possible by trial-and-error experimentation to arrive at the proportion suitable to produce a coherent foamed structure for any type of pressurized composition falling within the invention.

The foamed structure that is obtained can have open or closed cells or pores, or both, in any desired proportion. The proportion of open cells to closed cells in the foamed structure can be controlled by adjusting the stability of the liquid foam and the softness of the polymer, including the effect of plasticizers. The greater the stability of the liquid foam and the harder or less cohesive the polymer, the more open is the structure. However, if the liquid foam is too stable, or the polymer too hard, a coherent foamed structure may not be produced. Therefore, to obtain a coherent foamed structure, either the polymer must be softened, such as by addition of more plasticizer, or the stability of the liquid foam must be reduced. Used as a dressing for the topical application of a medicament, it need not have a high mechanical strength, and can be formed from a composition producing a fairly stable liquid foam and a polymer that is only slightly plasticized. In that event, the structure will have a high proportion of open pores. However, if the structure is to be used as an applicator pad by rubbing firmly against an object for the purpose of cleaning, it should have considerably greater mechanical strength. This often requires a liquid phase producing a less stable foam and a more highly plasticized polymer. In general, if the polymer is too soft or is overly plasticized, the pad will have poor rubbing qualities. Trial-and-error experimentation are required to determine the proper liquid foam stability and polymer softness for themechanical strength needed for a specific application. The more open the pore structure, the weaker the structure. If high tensile strength is desired, the proportion of open area should be kept low.

It is advantageous that the liquid phase of the emulsion should have a low surface tension, preferably less than the critical surface tension for wetting of the resin, invariably less than 45 dynes per centimeter. Then the liquid phase will have a greater tendency to spread over exposed surfaces of the structure (interior and exterior surfaces), and interfere with the healing of ruptured pores, keeping the pores open and interconnected. If the wetting action is too low, the propellant becomes trapped in closed cells, and the proportion of open cells is too low. If it is too high, a coherent pad is not obtained, unless wetting is sufficiently restrained by the stability of the liquid foam, or by reducing the proportion of that liquid phase in the composition.

Thus, the porous foamed structure is composed of a reticulated polymer matrix comprising the walls defining the pores and/or cells, and the relative plasticity or brittleness of this polymer to a considerable extent determines the proportion of through pores, connected by way of ruptured cell walls. The thinness of the walls is also a factor, but this is not readily controlled, except to the extent that it is dependent of the concentration of polymer in the propellant solution. In general, the more plasticized the polymer, the thicker the cell walls. If the plasticizer is volatile and fugitive, plasticity can be reduced with time, and thick-walled structures will become more rigid, and the walls will be broken when the structure is compressed or squeezed, as when it is used as an applicator, thus liberating any material held in the cells.

Accordingly, it is advantageous in accordance with the invention first to establish the foam stability and relative liquid and propellant phase proportions of a given emulsion system that yields an open pore coherent foamed structure, and then adjust the proportion and size of the pores by control of plasticity, even if only fore the time required for foaming and shortly thereafter by using a volatile plasticizer. One can in this way control the relative proportion of open cells, and even the stage at which closed cells will be opened. This control is obtained by controlling the amount and kind of plasticizer, so as to control both the degree of plasticization and the time during which the polymer is plasticized. The amount required necessarily varies with the polymer, the propellant, and the plasticizer, as well as the kind of structure that is formed, and because of the number of variables an empirical determination is needed for each case, by trial-and-error experimentation.

The polymer is blended with a liquefied propellant, any platicizer and/or a volatile solvent for the polymer or a liquid which in the presence of the other components has a solvent or plasticizing action on the polymer, and this is then emulsified in the organic liquid as a polymer-propellant-solution-in-liquid emulsion under a pressure sufficient to retain the liquefied propellant in the liquid phase. The emulsion is foamed to form a structure by reducing the pressure sufficiently to volatilize the propellant. A foaming agent or foam stabilizing agent can be present in the organic liquid, or added to the liquid phase later. An additive may be present, but need not be. It may be advantageous if it affects polymer plasticity or stability, viscosity, emulsion stability or foam stability. The structure can then be examined for the number of open and closed cells present, and if there are too many open cells, polymer plasticity can be increased, while if there are too many closed cells, polymer plasticity can be reduced. A determination can also be made empirically in terms of the amount of liquid phase that can be expelled from the structure. In this way, the right structure can be obtained by adjustment of the formulation or the composition of the emulsion.

The polymer-propellant-in-liquid emulsions of the invention can be prepared by blending the organic liquid, propellant, polymer particles, foaming agent, and any other ingredients, dissolving the resin in thepropellant, and dispersing the resulting solution in the organic liquid phase. Because the polymer is soluble in the propellant phase, an emulsion of the polymer in the organic liquid can be blended with foaming agent and propellant, thereby dissolving dispersed resin particles in the propellant and dispersing the propellant solution in the organic liquid before addition of the propellant. The polymer can also be dissolved in the propellant, and the resulting solution dispersed in the organic liquid phase containing the foaming agent.

It may be advantageous to allow an extended time for dissolution of the polymer in the propellant if polymer particles or an organic liquid dispersion of polymer particles is used as a starting material. Dissolution may be slow, and ageing of the emulsions may also be helpful, in producing a superior pad, for reasons not presently understood. Viscosity of the solution may be a factor in the ageing, since viscosity may diminish on ageing, depending on the polymer, and this can be advantageous.

As the propellant, there can be used in the compositions of the invention any volatile organic compound that has a boiling temperature below 45°F. at atmospheric pressure, and that is chemically inert to the polymer and the additive that may be present in the compositions. Thus, hydrocarbons such as propane, n-butane, and isobutane can be employed, as well as halogenated hydrocarbons such as vinyl chloride, methyl chloride, methyl bromide, dichlorodifluoromethane (Propellant 12), 1,1-dichloro-1,1,2,2-tetrafluoroethane (Propellant 114), 1-chloro-1,1-difluoro-etane (Propellant 142B), 1,1-difluoroethane (Propellant 152A), chlorodifluoromethane (Propellant 22), 1-chloro-1,1-difluoro-2,2-trifluoroethane (Freon 115), octafluorocyclobutane (Freon C318), a mixture of dichlorodifluoroethane and 1,1-difluoroethane (Freon 500), a mixture of chlorodifluoromethane and 1-chloro-1,1-difluoro-2,2,2-trifluoroethane (Freon 502).

The invention is applicable to any polymer that is soluble in a propellant falling within the above class or can be made soluble by the addition of a third material (such as a solvent or a material that shows solvent properties in the combination or the additive) and that is also film-forming, so that it tends to form a cohesive foam structure upon evaporation of a propellant solution thereof. Thermoplastic polymers as a class, thermo-setting polymers in a propellant-soluble stage of polymerization, and propellant-soluble polymers capable of being cross-linked, can be used. The polymerization or cross-linking of the latter two types of polymers can be effected during or after the structure has been formed, to set the structure. Alkyl acrylate and alkyl methacrylate polymers and copolymers, such as ethyl methacrylate, butyl methacrylate, isobutyl methacrylate, 50/50 n-butyl/isobutyl methacrylate copolymer, 25/75 lauryl/isobutyl methacrylate copolymer, 30/70 stearyl/t-butyl methacrylate copolymer, 50/50 ethyl/n-butyl methacrylate copolymer, copolymers of acrylic and vinyl compounds, such as 50/50 vinyl toluene/isobutyl methacrylate copolymer, 50/35/15 vinyl toluene/t-butyl methacrylate/stearyl methacrylate terpolymer, 50/50 ethyl acrylate/vinyl acetate copolymer, certain other vinyl polymers, such as polyvinyl acetate, vinyl toluene-butadiene copolymers, carboxylated vinyl acetate, certain cellulose derivatives, such as ethyl cellulose, cellulose acetate, cellulose propionate, cellulose acetate butyrate and cellulose acetate propionate, and certain silicone polymers such as Silicone XC-20997, are soluble in propellants of the class set forth.

Polymers which can be set to a solvent-insoluble stage of polymerization chemically or by radiation include urethane prepolymers, unsaturated polyesters such as unsaturated alkyd resins, and polyolefins such as polybutylene and poly-2-methyl-butene-1.

The polymer should have a molecular weight within the range from about 10,000 to about 1,000,000. Polymers of molecular weights below about 10,000 may not have sufficient cohesive strength to form a cohesive foamed structure, while those with molecular weights in excess of about 1,000,000 may be insoluble in propellant solvents. Polymers having molecular weights within the range from about 25,000 to about 600,000 are preferred.

The relative proportions and type of propellant and polymer in the polymer-propellant phase of the compositions of the invention determine to a considerable extent the nature of the foamed structure that is formed, when the prssure upon the emulsified composition is reduced, such as to atmospheric pressure, and the propellant allowed to volatilize rapidly. The composition should in the absence of organic liquid when expelled from an aerosol container form a cohesive foam. If the proportion of polymer is too low (and usually the lower proportion is not less than approximately 10% polymer by weight of the propellant phase) a cohesive foamed structure may not be formed or, if it is formed, it may disintegrate easily. The tendency instead is to form a bubbly, sticky, flowable foamed mass. If the proportion of polymer is too high, other difficulties will be encountered, due to the high viscosity of the polymer propellant solution (which affects the nature of the foam, as well as the toughness of the resultant foamed structure). For example, if the propellant phase does not expand sufficiently, due to the high viscosity, a cohesive foamed structure may not be obtained. Further, if phase separation of the emusion occurs, it may not be possible to effect reemulsification by hand-shaking.

Usually, however, the composition may contain up to 50% by weight of polymer by weight of the total propellant phase, before performance is seriously impeded by the high proportion of resin, and sometimes as much as 70% polymer can be present, depending upon the molecular weight of the polymer and its solubility in the propellant that is used.

In addition to the propellant and the polymer, which are the essential ingredients of the propellant phase of compositions of the invention, the polymer-propellant phase cna include additional less volatile or relatively nonvolatile solvents, which may be solvents or cosolvents for the polymer, or alternatively solvents for any additive that may be present, or which may be solvents for both the polymer and the additive. There may also be plasticizers for the polymer, coloring agents, fillers for the polymer which modify the polymer component of the foamed structure, and a curing agent for the polymer, if the polymer is in a partially polymerized condition, so that polymerization of the polymer can be completed after the foamed structure has been formed, to set the structure in a desired configuration.

It is usually preferred that liquid components of the propellant phase that are not propellants and that act as solvents for the polymer not exceed twice the weight of polymer present, and in most cases they should not exceed the weight of polymer present. In general, the amunt of such solvent should also not be greater than the amount by weight of propellant present. However, the exact amount that can be tolerated will depend upon the concentration of polymer in the propellant composition, as well as whether the liquid is a good or poor solvent for the polymer.

Liquids which are higher boiling than the propellant will modify the foamed structure. If they are also solvents for the polymer, they may also plasticize the polymer during the period after the propellant has been volatilized, and before the remaining less volatile solvent is fully volatilized. Such a transitional plasticized stage can be useful in forming the foamed structure into a desired configuration, and it may also aid the formation of a higher proportion of closed or nonruptured cells.

Examples of solvents that boil at or above about 45°F. include dichlorofluoromethane, trichlorofluoromethane, 1,1,2-trichloro-1,2,2-trifluoroethane, 1,2-dibromo-1,1,2,2-tetrafluoroethane, 1,1,2,2-tetrachloro-1,2-difluoroethane, methanol, ethanol, acetone, methyl isobutyl ketone, benzene, toluene, xylene, chloroform, methylchloroform, methylene chloride, 1,1,1-trichloroethane, and perchloroethylene.

Plasticizers can also be incorporated. These are selected according to the nature of the polymer, and since they are nonvolatile permanently soften the foamed structure.

Plasticizers which may be used include butyl phthalyl butyl glycolate, tributyl citrate, acetyyl tributyl citrate, tricresyl phosphate, dibutyl tartrate, dibutyl phthalate, di-2-ethylhexyl azelate, chlorinated biphenyl and methyl abietate.

Fillers for the polymer can be used as extenders for the polymer, and may also modify the physical properties of the foamed structure. The filler usually has a small particle size, although fibrous material also can be used. Satisfactory fillers include chalk, talc, silica, diatomaceous earth, clay, asbestos, magnesium silicate, calcium silicate, kaopolite, powdered polyethylene and powdered polystyrene. The filler can be from 0 to 300% by weight of the polymer. Coloring agents including dyes and pigments are used in small proportions, ranging from 0 to 10% by weight of the polymer.

The emulsified compositions of the invention usually are composed of two liquid phases, one of which, the polymer-propellant phase, is emulsified in the organic liquid phase, with the organic liquid serving as the continuous phase, but there can be more than one phase emulsified in the organic liquid phase. The continuous organic liquid phase also can include, for example, a solution of the additive. When the propellant is volatilized, and the foamed polymer structure is formed, the liquid phase (optionally comprising the additive) is then deposited in the pores and cells.

The organic liquid of the organic liquid phase is a liquid at atmospheric temperature and pressure. It may be volatile or nonvolatile, as desired, under these conditions, but the polymer should be insoluble or only slightly soluble in the organic liquid phase at atmospheric temperature. If the propellant is soluble in the organic liquid phase, it will partition between the two phases, and if the organic liquid is soluble to some extent in the polymer-propellant phase, it will also partition between the two phases, but this does not interfere with formation of the foamed product, although it may modify the structure of the foamed product, since the propellant volatilizes in whichever phase it is found, and the organic liquid does not volatilize, if at all, until after the foamed structure is formed, and is found in the cells and pores thereof.

For instance, if the organic liquid partitions between the organic liquid phase and the polymer-propellant phase, it may alter the solubility of the polymer in the propellant phase, the viscosity of the propellant phase, and the plasticity of the polymer. These changes may be advantageous or disadvantageous, according to the emulsion.

If the organic liquid is soluble to a large extent in the polymer-propellant phase, and the organic liquid is a plasticizer for the polymer, thepolymer structure that is formed will contain the organic liquid, and will be plasticized thereby. If such plasticization is not desired, the organic liquid selected is not a plasticizer for the polymer, or the polymer selected is not plasticized by the organic liquid.

The relative proportion of organic liquid in the emulsified polymer-propellant-in-liquid compositions of the invention is chosen by trial-and-error, as noted previously. Usually, however, the organic liquid is in an amount within the range from about 26% to about 60% by weight of the composition.

It has also been found to be advantageous, to facilitate escape of the propellant from the foamed structure, to include a small amount, within the range from about 0.05 to about 10%, of a finely divided powder, less than 100 mesh, that is insoluble both in the organic liquid and in the propellant phases. The powder serves as a nucleating agent for volatilization of the propellant. The powder may also reduce plasticity of the foamed structure.

In general, any organic liquid that does not react in a deletrious manner with other components of the composition may be used provided that it can be added to the polymer-propellant solution in a sufficient amount to form a second liquid phase without simultaneously plasticizing the polymer to such an extent that at atmospheric temperature and pressure a foamed structure is not formed, or if it is formed it is not excessively plasticized for the intended application. Any organic liquid that is not a solvent or a plasticizer for the polymer can generally be used. Organic liquids that are good solvents or plasticizers for the polymer may also be used under certain circumstances. If water is sufficiently soluble in the organic liquid, a suitable amount of water can be added to decrease the concentration of the organic liquid in the polymer-propellant phase to a level where the polymer is not excessively plasticized. Alternatively, the organic liquid can be dissolved in a second organic liquid that is poorly soluble in the polymer-propellant phase, and it will partition between the phases. The amount present in the polymer-propellant phase shold not be excessive and cause overplasticizing of the polymer when the structure is formed.

As the organic liquid, there can be used alkylene glycols and higher polyols having at least two carbon atoms and from two to four hydroxyl groups, such as ethylene glycol, glycerol, propylene glycol-1,2 and 1,3; butylene glycol-1,2,-1,3, -1,4 and -2,3; 1,5-pentanediol, hexylene glycol, 1,2,6-hexanetril, 2-ethylhexanediol-1,3; polyoxyalkylene glycols, such as polyethylene glycol, polypropylene glycol, polybutylene glycol, and polyethylene-propylene glycol, diethylene glycol, triethylene glycol, tetraethylene glycol, dipropylene glycol, tripropylene glycol, diethylene glycol methyl ether, diethylene glycol ethyl ether, diethylene glycol butyl ether, and dipropylene glycol methyl ether, polyethylene glycol 200, polyethylene glycol 400, polyethylene glycol 600, polypropylene glycol 150, polypropylene glycol 425, polyglycol 11-80, polyglycol 11-100, polyglycol 15-100, polyglycol 15-200 and methoxy polyethylene glycol 350; aliphatic monohydric alcohols such as ethanol and isopropanol having from one to about four carbon atoms and aliphatic and cyclic hydrocarbon liquids having from about 10 to about 25 carbon atoms, such as kerosene and mineral oils.

A liquid polymer having a relatively low viscosity, less than about 10,000 cps at 25°C, and a molecular weight below about 500, can also be used as the organic liquid. Exemplary are silicone oils such as polysiloxane, polydienes such as polyisobutylene and isobutylene-isoprene copolymers, polyesters, polystyrene, polyterpene resins, and aromatic and coal tar resins. organic liquid can be water-soluble or water-insoluble. If water is soluble in the organic liquid phase, water can be added thereto to reduce the solubility of the propellant therein, as well as to prevent too high a proportion of the organic liquid from being dissolved in the polymer-propellant phase and over-plasticizing theh polymer when the structure is formed.

A solid additive can be dispersed in the polymer-propellant solution phase, or in the organic liquid phase. It will be deposited in the cells and pores of the structure with the organic liquid phase when the structure is formed. Preferably, in this case the solid additive is preferentially wetted by the organic liquid phase, remains dispersed in that phase, and can be removed from the pores as a dispersion in the organic liquid phase. As used herein, the term "additive in liquid form" means an additive which is a liquid or liquid solution or which is a solid dissolved in or dispersed in an organic liquid so as to be in liquid form.

The foam-stabilizing agents are soluble or dispersible in the organic liquid phase and include both water-soluble and oil-soluble organic surfactants and fine-particle size organic and inorganic solids. The organic liquid phase can be formulated to contain single or multiple foam-stabilizing agents, such as the combination of a soluble with a dispersible agent or a combination of soluble agents. Thus, a dispersible metallic soap can be used in combination with a soluble amine soap or an anionic synthetic surfactant or a nonionic synthetic surfactant, or they can be composed wholly of soluble surfactants, including the anionic, cationic and nonionic types. Many of the known types are listed by McCutcheon's *Detergents and Emulsions Annual*, 1970, (The Allured Publishing Company, Ridgewood, N.J.). Any of the surfactants listed by McCutcheon, the disclosure of which is hereby incorporated by reference, can be used.

The choice of foam-stabilizing agent will depend both on the composition of the organic liquid phase and the degree of foaming required. Typically satisfactory agents include fatty alcohols, such as cetyl and stearyl alcohol; fatty acids, such as palmitic and stearic acid; fatty amines, such as cetyl amine and stearyl amine; glycol and polyol esters of fatty acids, such as ethylene glycol monostearate, propylene glycol monostearate, sorbitan monostearate and glyceryl monostearate; ethoxylated derivatives of those fatty materials, such as the condensation products of fatty alcohols, fatty acids, fatty amines, and glycol and polyol esters of fatty acids with one to fifty moles of ethylene oxide; ethylene oxide-propylene oxide block polymers; silicone surfactants, such as fatty acid esters and glycol ethers of dimethylpolysiloxanes; metallic soaps, such as zinc stearate and aluminum stearate; alkali metal and amine soaps, such as sodium laurate, sodium plamitate, morpholine oleate, and monoethanolamine stearate; anionic nonsoaps. such as petroleum sulfonates, sulfonated castor oil, triethanolamine laurylsulfate, dodecylamine laurylsulfate, sodium keryl benzene sufonate, sodium palmitic tauride, sodium lauroyl sarcosinate, sodium stearoyl lactylate, sodium dioctyl sulfosuccinate, sodium lauroyl isethionate, and sodium lauryl sulfoacetate; and cationic nonsoaps, such as cetyltrimethyl ammonium bromide and dimethyl distearyl ammonium chloride.

The term "soap" as used herein refers to alkali metal, ammonium, and amine soaps of the saturated and unsaturated higher fatty acids having from about eight to about 26 carbon atoms, such as capric, caprylic, lauric, myristic, palmitic, stearic, oleic, linoleic, linolenic, arachidic, behenic, margaric, tridechoic, and cerotic acids, and the mixtures of such acids naturally occurring in fats, oils, waxes and rosins, such as the soaps of coconut oil fatty acids, tallow fatty acids, lard fatty acids, fish oil fatty acids, bees-wax, palm oil fatty acids, sesame oil fatty acids, peanut oil fatty acids, olive oil fatty acids, palm kernel oil fatty acids, corn oil fatty acids, babassu oil fatty acids, rosin acids, abietic acid, and greases. "Metallic soaps" refer to divalent and trivalent soaps of these fatty acids.

Water-soluble natural and synthetic gums with foaming action in organic liquids include solvent-soluble methyl cellulose, ethyl cellulose propyl cellulose, ethyl hydroxyethyl cellulose, ethyl hydroxymethyl cellulose, propyl hydroxypropyl cellulose, guar gum, polyvinyl pyrrolidone, the alginates, polyvinyl alcohol, gum arabic, gum tragacanth, gum karaya, polyacrylic acids, and salts thereof, such as ammonium polyacrylate, and polypeptides and derivatives thereof.

The amount of organic liquid phase that can be used in the composition is limited by various factors. The lower limit of organic liquid phase is established by the amount required for the formation of a polymer-propellant-in-liquid emulsin. Generally, this is not less than about 10% by weight of the total emulsin, and more commonly at least about 26% by weight of the total emulsion is required. The upper limit of the liquid phase is established by the amount that will interfere with the formation of a cohesive foamed structure. If the liquid phase produces a stable foam, too large a proportion of the phase will interfere with the formation of a foam structure. If the liquid phase gives an unstable foam, it may prematurely wet out the polymer as the foamed structure is being formed, preventing cohesion of the polymer to form a structure. Further, if the amount of liquid phase is too high, any structure that may form will be very weak. The liquid phase should nt exceed about75% by weight of the total emulsion, and generally, it should not be more than about 60% by weight of the total emulsion.

The amount of foam-stabilizing agent required in the liquid phase must be determined by trial and error. None may be needed or it may be as much as 20% or more by weight.

Any additive that is dispersible in the organic liquid phase or is soluble in the organic liquid phase, and is not chemically attacked by components of either phase, can be incorporated in the compositions of the invention, and will remain with the liquid phase in the foamed resin structure after the propellant has been volatilized. The additive will always be found in the cells and pores with the liquid phase after the structure is formed. If it is soluble in the liquid phase, a liquid phase solution of the additive is present in the cells. If it is dispersible in the liquid phase, it will be found dispersed therein, and this is particularly so when the additive is a solid that is insoluble in the organic liquid.

Apart from these requirements, which are purely physical, any type of additive can be employed, depending upon the intended use for the structure.

When alternative additives are available to perform the same function, it is preferable to select the additive that is comparatively insoluble in the polymer and is quite soluble in the organic liquid phase that will subsequently occupy the cells and the pores of the foamed structure.

In general, the organic liquid phase is or contains the functional additive of the foamed structure, and is deposited in the cells and pores of the foamed polymer structure. The foaming agent itself can be the additive, since many aqueous foam-stabilizing surfactant solutions have cleaning properties, which of course vary with the foaming agent. Thus, sodium lauryl sulfate is a better cleaning agent than an ethoxylated oleic acid. Any aqueous foaming solution of a cationic nonsoap such as cetyltrimethyl-ammonium bromide has antiseptic and deodorizing properties.

Glycerol and the aliphatic lower glycols serv as cosmetic moisturizers, humectants and lubricants. Mineral oil serves as a lubricant and water repellent. Water can be used with glycols or monohydric alcohols to increase the solubility of additives that are poorly soluble in the organic liquid, as well as to reduce the solubility of the propellant in the organic liquid phase. Any organic liquid-dispersible additives can be included in the organic liquid phase to achieve specific effects.

A liquid that is normally present in the propellant phase of the emulsion but is not compatible with the polymer may also serve as the functional additive. When the composition is converted to a foamed structure, this liquid will separate from the polymer matrix and occupy the pores. Dimethylpolysiloxane is incompatible with most polymers and will separate out in this manner. This silicone will function as a glossing agent when the foamed structure is a pad used for polishing. The liquid that separates from the polymer in this manner may also serve as a solvent for other additives.

In one form of the invention, a codispensing valve may be used. Such valves are capable of simultaneously mixing and dispensing materials from two separate compartments.

The foamed structures of the invention, for example, are particularly useful as applicator pads for external or topical application of cosmetics of all types, such as those intended for cleansing, conditioning, lubricating, and protecting the skin, hormone preparations, suntan preparation, skin lighteners and bleach creams, foundation makeups, eye makeups, pre-shave and aftershave preparations, depilatories, hair grooming preparations, permanent wave preparations, hair straightening preparations, anti-dandruff preparations, bath preparations, nail lacquers and removers, antiperspirants and deodorants, fragrance-imparting preparations, perfumes, baby toiletries, and hypoallergenic cosmetics. They are also useful applicators for soap and synthetic detergent preparataions of all types for personal washing, laundering, dishwashing, cleansing of silver, shampoos, shaving soaps and creams, hair colorings and dye removers, wave sets, lacquers, rinses and conditioners, and dry shampoos. They are also useful applicators for medicaments of all types, antimicrobial agents, such as bactericides and anti-fungal agents of all types, and antibiotics, for external application, such as topical or rectal, for instance, as suppositories.

The structures are also useful for furniture polish, shoe polish and furniture and shoe cleaners, floor cleaners, automobile cleaners and polishes, and porcelain, tile and plastic cleaners. When abrasives are included as the additive, they can serve as abrasive pads and scouring pads.

Exemplary medicaments that can be combined in the emulsions of the invention include the antihistamines, sulfa drugs, for example, sulfadiazine, sulfabenzamide, sulfacetamide, sulfanilamide, sulfapyridine, sulfathiazole, sulfapyrazine, sulfaguanidine, sulfaphthalidine, sulfasuxidine, sulfaoxazole, sulfamylon, phthalylsulfacetamide, N'-3,4-dimethylbenzoylsulfanilamide; benzylsulfanilamide and N'-2-(2-quinoxlyl) sulfanilamide; lipotropic agents, such as methionine, choline, inositol and beta-sitosterol and mixtures thereof; local anesthetics, such as benzocaine and pramoxine hydrochloride; essential oils such as menthol, eucalyptus oil and eugenol; salts of penicillin, such as potassium penicillin G, procaine, penicillin G, 1-ephenamine penicillin G, dibenzylamine penicillin G, and other pencillin salts disclosed in U.S. Pat. No. 2,627,491; phenoxymethylpenicillin and salts thereof; additional antibiotic agents, such as streptomycin, dihydrostreptomycin, bacitracin, polymixin, tyrothricin, erythromycin, chlortetracycline, oxytetracycline, tetracycline, oleandomycin, chloramphenicol, magnamycin, novobiocin, cyclosterine and neomycin; vitamins, for instance, vitamins A, $A_1$, $B_1$, $B_2$, $B_6$, $B_{12}$, and members of that family, folic acid and members of that family, and vitamins C, $D_2$, $D_3$ and E; hormones, such as cortisone, hydrocortisone, 9-$\alpha$-fluorocortisone, 9-$\alpha$-fluorohydrocortisone, prednisone and prednisolone; anagolic agents, such as 11,17-dihydroxy-9-$\alpha$-fluoro-17-o-methyl-4-androsten-3-one and 17-$\alpha$-ethyl-19-nortestosterone, and additional antimicrobial agents, such as mycostatin, mercurichrome, iodine, methiolate, hexachlorophene, tribromosalicylanilide, trichlorocarabanilide, and undecylenic acid.

These medicaments are preferably selected as to be soluble in the organic liquid phase. The amount of medicament is not critical, and is chosen to meet the need; usually, from 0.02 to about 15% is adequate.

Various preparations, including elixirs and organic liquid solutions and emulsions which may contain cosmetic and toiletry ingredieints, medicaments, and cleansing agents, can be compounded so that they can be emulsified with polymer and propellant in sufficient concentration for an applicator pad to form and for the preparation to ooze from the aplicator pad.

Many of the organic compounds that are used in cosmetic lotions, such as mineral oils and fatty esters, serve as plasticizers for some resins. Care should be exercised in the combination of organic compounds and polymer that a useful applicator pad is obtained.

In one form of this invention, a codispensing valve may be used. Such valves are capable of simultaneously mixing and dispensing materials from two separate compartments. Thus, one compartment would contain the pad-forming composition and the other would contain the cosmetic or other additive.

The emulsified polymer-propellant-in-liquid compositions of the invention are converted into foamed polymer structures when the propellant is permitted to volatilize. This is easily accomplished, with almost immediate volatilization of a substantial proportion of the propellant, by storing the propellant composition in a closed container, where the autogenous pressure is sufficient to maintain the propellant in the liquid phase, and then rapidly reducing the pressure to atmospheric pressure at room temperature, whereupon the propellant rapidly volatilizes and the foamed structure is formed. The emulsified polymer-propellant compositions may also be stored in a closed container, under applied pressure greater than the autogenous pressure rising from the propellant itself to facilitate expelling the composistion from the container, as through a valve or orifice, into the atmosphere. Because of high volatility of the propellants employed, the polymer structure is nonsticky, unless a plasticizer or other nonpropellant solvent for the polymer is also present in sufficient amount to impart a sticky characteristic to the polymer. If the structure is to be adhered to a surface, stickiness can be desirable. In the case of a solvent that also volatilizes, although more slowly than the propellant, this sticky condition is transitory, however, and exists only until the solvent has been removed. Excessive stickiness is undesirable in an applicator pad. In general, the organic liquids used to form the continuous phase of the emulsion act as lubricants and thus prevent stickiness.

If a composition formulated to produce a pad with a high proportion of closed cells is ejected into a confined space, such as a mold, preferably closed, the foamed structure will acquire the configuration of the mold, and a molded object is obtained. The molding can be carried out at room temperature, without application of external pressure, since a pressure sufficient to ensure that the structure conforms to the configuration of the mold is obtained upon volatilization of the propellant at atmospheric pressure and temperature.

If the emulsified composition is ejected into the atmosphere, the foamed structure will have an irregular shape. It is quite convenient, in practicing this embodiment of the invention, simply to eject the composition from the container into the hand, forming a pad of any desired size, which is controlled by controlling the duration of the ejection period. For this purpose, the propellant compositions of the invention are suitably packaged in aerosol containers of the standard type, the valve being controlled by one hand, and the foamed structure being received in the other. The foamed structure is formed almost instantaneously, and the applicator pad is ready for use within seconds after the procedure has begun. The structure is shape-retaining because of the nature of the polymer used, and it is also flexible initially because of the retention of some propellant, even if no plasticizer is present, i.e., if the polymer is a rigid polymer.

Alternatively, the valve actuator may be shaped as a dish or a hemisphere so that it acts as a receptacle or mold for the foamed structure as it is being formed, and the interior shape of the receptacle or mold determines the shape of the foamed structure.

The foamed structures can be stretched to some extent and compacted as they are being formed, and in this way can be made to conform to the shape of the object upon which it is being applied, so as to form a covering or a coating. When applied to the body, for example, a coating including a medicament for release to the skin can be formed, which can be allowed to remain in contact with the skin for long periods, for slow release of the medicament over a long period of time. However, because the emulsified compositions are so rapidly converted into a foamed structure, they are not actually flowable, and will not spread voluntarily. In this respect, they differ from conventional aerosol paints or lacquers, from which the solvent is removed only slowly, and which are consequently flowable, and can be spread out to a film that may be only a few mils thick, and they also differ from the spreadable compositions described in U.S. Pat. No. 3,419,506 to Gander.

Prior to expulsion from the container, however, the emulsified compositions are flowable. The viscosity of the fluid composition is in no way critical, provided the composition is sufficiently flowable to be ejected from the container under pressure. The viscosity, accordingly, can range from a thin, quickly flowable liquid, to a rather thick, barely flowable, thixotropic or gel-like composition.

When the dispersed propellant phase remains uniformly distributed in the organic liquid, the viscosity may be as high as 1,000,000 cp at atmospheric temperature. However, when the emulsion is likely to undergo settling or layering and it is necessary to shake before expelling a portion of the contents, it is necessary that the viscosity not exceed about 50,000 cp, and preferably it should be less than 10,000 cp, at atmospheric temperature.

In the event that the propellant employed in the compositions of the invention has a sufficient vapor pressure at ambient temperature, it will also serve as a propellant to expel the material from the pressurized container in which it is confined. In the event that its vapor pressure is insufficient, additional pressure may be provided in the container by a suitable pressurizing gas, such as nitrogen, nitrous oxide or carbon dioxide. Because commercial regulations limit the total pressure of common aerosol containers to not more than about 150 psig, the propellant employed is preferably one whose vapor pressure in the propellant composition does not exceed this limit.

The emulsified propellant compositions of the invention can be packaged in containers of the type commonly known as an aerosol can, fitted with a discharge valve which will allow a foamed discharge.

The emulsified propellant compositions are prepared by conventional procedures. For example, the solid and normally liquid ingredients may be combined and stirred until the composition is uniform. Suitable portions are then filled into individual aerosol cans, which are capped and pressurized in conventional fashion with the normally-gaseous liquefied propellants. The individual packages are shaken or otherwise agitated until the polymer dissolves and the composition is uniform. Alternatively, all of the ingredients may be combined and stirred in an autoclave until the polymer dissolves and the composition is uniform. The cans are filled and capped before releasing the pressure on the material. With any of these procedures, heat can be used to increase the rate at which the polymer dissolves.

In another embodiment, the aerosol can will contain a piston or bellows which separates the interior of the can into two compartments or zones. The first compartment, which contains the material to be dispensed, is in communication with the discharge valve. The second compartment is filled with a secondary propellant which provides pressure in the container which is in excess of the vapor pressure of the composition in the first compartment. The secondary propellant may be a compressed gas such as nitrogen or a normally-gaseous liquid propellant. The latter is preferred since it provides a constant back-up pressure to expel the material. Examples of such cans are disclosed in U.S. Pat. Nos. 2,815,152, 3,245,591 and 3,407,974.

The following Examples in the opinion of the inventors represent preferred embodiments of the invention.

EXAMPLE 1

An emulsion suitable for use in preparing a moisturizer-humectant applicator pad was prepared as follows:

Vinyl toluene-acrylate polymer (Pliolite VTAC-L) was dissolved in a mixture of trichlorofluoromethane and dichlorodifluoromethane in the amounts shown in the following Table, and then blended with propylene glycol to form an emulsion in which the propylene glycol phase was the continous phase and the solution of Pliolite in propellant was the discontinuous phase.

|  | Parts by Weight |
|---|---|
| Pliolite VTAC-L (vinyl toluene-acrylate copolymer-) | 20 |
| Trichlorofluoromethane | 20 |
| Dichlorodifluoromethane | 20 |
| Propylene glycol | 40 |

The mixture was prepared in a pressure container and then filled in aerosol cans. The emulsion was expelled from the aerosol can into the palm of one hand, and formed into a pad. A plastic foam was produced, which felt oily to the touch and when squeezed exuded additional propylene glycol. The pad could be used as an applicator pad for applying propylene glycol to the skin as a moisturizer anad humectant.

EXAMPLE 2

An emulsion suitable for use in preparing a applicator pad for applying mineral oil to the skin, as for example to clean and oil babies and prevent diaper rash, as well as to remove eye make-up, was prepared as follows:

Polyisobutyl methacrylate (100,000 molecular weight) and powdered polyethylene (less than 30 micron average diameter) were combined with mineral oil, ethanol and the propellants noted, in the amounts given, in the following Table:

|  | Parts by Weight |
|---|---|
| Polyisobutyl methacrylate (100,000 mol wt) | 13.3 |
| Powdered polyethylene (less than 30 micron average diameter) | 6.7 |
| Mineral oil, 180–190 SSU at 37.8°C | 28.5 |
| Ethanol | 3.3 |
| 1,2-Dichlorotetrafluoroethane | 25.2 |
| Dichlorodifluoromethane | 23.0 |

The mixture was stirred until the methacrylate had dissolved. The solution of polymer in the propellants, ethanol and part of the mineral oil was the discontinuous phase, and the remainder of the mineral oil containing part of the propellant mixture as the continuous phase, of the emulsion that formed. The powdered polyethylene dispersed in the emulsion.

The composition was filled in aerosol cans, and the emulsion expelled from the aerosol can into the palm of one hand and formed into a pad. A plastic foam was produced, which was oily to the touch, and when squeezed exuded additional mineral oil. The pad could be used as an applicator pad to apply mineral oil to the skin of babies, and to women, to clean and oil the babies and prevent diaper rash, and to remove eye make-up.

EXAMPLE 3

An emulsion suitable for use in preparing an applicator pad for applying propylene glycol to the skin was prepared as follows:

Using a pressure vessel, polyisobutyl methacrylate was dissolved in a solvent system composed of 1,2-dichlorotetrafluoroethane, and the other propellant-soluble ingredients noted in the Table below, in the amounts stated, and then blended with a solution of glycol polysiloxane surfactant in propylene glycol.

|  | Parts by Weight |
|---|---|
| Polyisobutyl methacrylate (100,000 mol wt) | 10.1 |
| Triethyl citrate | 0.9 |
| Oleyl alcohol | 1.2 |
| Mineral oil, 180–190 SSU at 37.8°C | 10.7 |
| Ethanol | 0.8 |
| 1,2-Dichlorotetrafluoroethane | 13.8 |
| Dichlorodifluoromethane | 12.5 |
| Glycol polysiloxane | 1.0 |
| Propylene glycol | 49.0 |

The composition was filled in aerosol cans, and the emulsion was expelled from the aerosol can into the palm of one hand and formed into a pad. A plastic foam was produced which was oily to the touch, and when squeezed exuded additional propylene glycol. It could be used as an applicator pad for applying propylene glycol to the skin, as a moisturizer and humectant, and to take advantage of its antimicrobial properties to prevent infections.

EXAMPLE 4

An emulsion suitable for use in preparing an applicator pad for applying 1,3-butylene glycol to the skin was prepared as follows:

Using a pressure vessel, polyisobutyl methacrylate was dissolved in a solvent system composed of 1,2-dichlorotetrafluoroethane, dichlorodifluoromethane and the other propellant-soluble ingredients noted in the Tabel below, in the amounts stated, and then blended with a solution of glycol polysiloxane surfactant in 1,3-butylene glycol.

An emulsion was formed in which the 1,3-butylene glycol phase was the continuous phase.

|  | Parts by Weight |
|---|---|
| Polyisobutyl methacrylate (100,000 mol wt) | 13.0 |
| Triethyl citrate | 1.1 |
| Oleyl alcohol | 1.6 |
| Mineral oil, 180–190 SSU at 37.8°C | 14.0 |
| Ethanol | 1.0 |

| | Parts by Weight |
|---|---|
| 1,2-Dichlorotetrafluoroethane | 18.0 |
| Dichlorodifluoromethane | 16.3 |
| Glycol polysiloxane | 0.7 |
| 1,3-Butylene glycol | 34.3 |

The composition was filled in aerosol cans, and the emulsion was expelled from the aerosol can into the palm of one hand and formed into a pad. A plastic foam was produced which was oily to the touch and when squeezed exuded the 1,3-butylene glycol. It could be used as an applicator pad for applying 1,3-butylene glycol to the skin as a moisturizer and humectant, and to take advantage of its antimicrobial properties, to prevent infections.

EXAMPLE 5

An emulsion suitable for use in preparing an antimicrobial applicator pad was prepared as follows:

Vinyl toluene-acrylate copolymer (Pliolite VTAC-L) was dissolved in a mixture of trichlorofluoromethane and dichlorodifluoromethane in the amounts shown in the following Table, and then blended with a solution of 3,4',5-tribromosalicylanilide in propylene glycol to form an emulsion in which the 3,4',5-tribromosalicylanilide in propylene glycol was the continuous phase and the solution of Pliolite in propellant was the discontinuous phase.

| | Parts by Weight |
|---|---|
| Pliolite VTAC-L (vinyl toluene-acrylate copolymer) | 20.0 |
| Trichlorofluoromethane | 20.0 |
| Dichlorodifluoromethane | 20.0 |
| Propylene glycol | 39.9 |
| 3,4',5-Tribromosalicylanilide | 0.12 |

The mixture was prepared in a pressure container, and then filled in aerosol cans. The emulsion was expelled from the aerosol can into the palm of one hand, and formed into a pad. A plastic foam was produced, which was oily to the touch and when squeezed exuded a solution of 3,4',5-tribromosalicylanilide in propylene glycol. The pad could be used as an applicator pad for applying 3,4',5-tribromosalicylanilide to the skin as an antimicrobial agent, to prevent infections.

EXAMPLE 6

An emulsion suitable for use in preparing an applicator pad for applying a solution of Vitamin E in mineral oil to the skin, as a deodorant, was prepared as follows:

Polyisobutyl methacrylate (100,000 molecular weight) and powdered polyethylene (less than 30 microns average diameter) were combined with a solution of Vitamin E in mineral oil, ethanol and the propellants noted, in the amounts given, in the following Table:

| | Parts by Weight |
|---|---|
| Polyisobutyl methacrylate (100,000 mol wt) | 13.3 |
| Powdered polyethylene (less than 30 micron average diameter) | 6.7 |
| Mineral oil, 180–190 SSU at 37.8°C | 28.2 |
| Ethanol | 3.3 |
| 1,2-Dichlorotetrafluoroethane | 25.2 |
| Dichlorodifluoromethane | 23.0 |
| Vitamin E | 0.3 |

The mixture was stirred until the methacrylate had dissolved. The solution of polymer in the propellants was the discontinuous phase, and the combination of Vitamin E and mineral oil was the continuous phase, of the emulsion that formed. In general, ingredients of each phase were present in the other phase to varying extents. The powdered polyethylene was dispersed in the emulsion.

The composition was filled in aerosol cans, and the emulsion expelled from the aerosol can into the palm of one hand and formed into a pad. A plastic foam was produced, which was oily to the touch, and which when squeezed exuded the combination of Vitamin E and mineral oil. The pad could be used as an applicator to apply Vitamin E to the skin as a deodorant.

EXAMPLE 7

An emulsion suitable for use in preparing an applicator pad for applying hydrocortisone to the skin as a healing agent for rashes was prepared as follows:

Polyisobutyl methacrylate in a pressure vessel was dissolved in a solvent system composed of 1,2-dichlorotetrafluoroethane, dichlorodifluoromethane and the other propellant-soluble ingredients noted in the Table below, in the amounts stated, and then blended with a solution of hydrocortisone and glycol polysiloxane in propylene glycol.

| | Parts by Weight |
|---|---|
| Polyisobutyl methacrylate (100,000 mol wt) | 10.1 |
| Triethyl citrate | 0.9 |
| Oleyl alcohol | 1.2 |
| Mineral oil, 180–190 SSU at 37.8°C | 10.7 |
| Ethanol | 0.8 |
| 1,2-Dichlorotetrafluoroethane | 13.8 |
| Dichlorodifluoromethane | 12.5 |
| Glycol polysiloxane | 1.0 |
| Propylene glycol | 49.0 |
| Hydrocortisone | 2.5 |

The composition was filled in aerosol cans, and the emulsion was expelled from the aerosol can into the palm of one hand and formed into a pad. A plastic foam was produced which was oily to the touch, and which when squeezed exuded the hydrocortisone solution of mineral oil, and could be used as an applicator pad for applying hydrocortisone to the skin, as a healing agent for rashes.

EXAMPLE 8

An emulsion suitable for use in preparing an antibiotic applicator pad for applying Penicillin O to the skin was prepared as follows:

Polyisobutyl methacrylate in a pressure vessel was dissolved in a solvent system composed of 1,2-dichlorotetrafluoroethane dichlorodifluoromethane, and the other propellant-soluble ingredients noted in the Table below, in the amounts stated, and then blended with a solution of Penicillin O and glycol polysiloxane in 1,3-butylene glycol.

|  | Parts by Weight |
|---|---|
| Polyisobutyl methacrylate (100,000 mol wt) | 13.0 |
| Triethyl citrate | 1.1 |
| Oleyl alcohol | 1.6 |
| Mineral oil, 180–190 SSU at 37.8°C | 14.0 |
| Ethanol | 1.0 |
| 1,2-Dichlorotetrafluoroethane | 18.0 |
| Dichlorodifluoromethane | 16.3 |
| Glycol polysiloxane | 0.7 |
| 1,3-Butylene glycol | 34.3 |
| Penicillin O | 0.7 |

The composition was filled in aerosol cans, and the emulsion was expelled from the aerosol can into the palm of one hand and formed into a pad. A plastic foam was produced which was oily to the touch, and when squeezed exuded the solution of Penicillin O in 1,3-butylene glycol. It could be used as an applicator pad for applying the antibiotic to the skin to counter or prevent infections.

Having regard to the foregoing disclosure, the following is claimed as the inventive and patentable embodiments thereof:

1. A polymer-propellant-in-organic-liquid emulsion comprising an organic liquid that is a liquid at atmospheric temperature and pressure, an additive, a film-forming synthetic polymer, and a liquid propellant boiling below 45°F. at atmospheric pressure, in a continuous organic liquid phase and a discontinuous propellant phase; the organic liquid comprising the continuous organic liquid phase, and the continuous organic liquid phase comprising from about 10% to about 75% by weight of the total emulsion; and the film-forming synthetic polymer being in solution in the propellant phase, the propellant phase comprising from about 10% to about 70% dissolved polymer, and from about 90% to about 25% by weight of the total emulsion; and the propellant being retained in the liquid phase at a superatmospheric pressure; the emulsion quickly forming upon rapid volatilization of the propellant at atmospheric temperature and pressure a coherent, voluminous foamed structure composed of a matrix of synthetic polymer containing cells or pores; the additive being dispersed or dissolved in the emulsion, and deposited with the organic liquid and the additive in the cells or pores thereof, when the propellant volatilizes, and removable in liquid form from the cells or pores of the structure.

2. A polymer-propellant-in-organic-liquid emulsion according to claim 1, having dispersed or dissolved in the emulsion at least one additive selected from the group consisting of foam-stabilizing agents, cosmetic compounds, medicaments, antimicrobial agents, antibiotics, cleaning compounds, polishing compounds and abrasives and mixtures thereof, which is deposited with the organic liquid in the cells of the structure when the propellant volatilizes, and which can be removed from the cells of the structure.

3. A polymer-propellant-in-organic-liquid emulsion according to claim 1, in which the synthetic polymer is selected from the group consisting of cellulose derivatives, vinyl polymers and vinyl copolymers.

4. A polymer-propellant-in-organic-liquid emulsion according to claim 3, in which the vinyl polymer is a methacrylate polymer or copolymer.

5. A polymer-propellant-in-organic-liquid emulsion according to claim 4, in which the vinyl polymer is polyisobutyl methacrylate.

6. A polymer-propellant-in-organic-liquid emulsion according to claim 1, in which the organic liquid phase of the emulsion comprises from 26 to 60% by weight of the total composition, and the propellant phase comprises from 10 to 60% by weight of synthetic polymer.

7. A polymer-propellant-in-organic-liquid emulsion according to claim 2, in which the additive is an antiperspirant.

8. A polymer-propellant-in-organic-liquid emulsion according to claim 2, in which the additive is in solution in the propellant.

9. A polymer-propellant-in-organic-liquid emulsion in accordance with claim 2, in which the additive is in solution in the organic liquid phase.

10. A polymer-propellant-in-organic-liquid emulsion in accordance with claim 2, in which the additive is dispersed in the organic liquid phase.

11. A polymer-propellant-in-organic-liquid emulsion in accordance with claim 2, in which the additive is dispersed in the propellant phase of the emulsion.

12. A polymer-propellant-in-organic-liquid emulsion according to claim 2 in which the foam-stabilizing agent is a member selected from the group consisting of organic surfactants and water-soluble gums.

13. A process for forming a foamed structure, which comprises expelling from a closed container a polymer-propellant-in-organic-liquid emulsion according to claim 1, and volatilizing the propellant at atmospheric temperature and pressure to foam the synthetic polymer and form a foamed structure containing the organic liquid in the cells or pores thereof.

14. A process according to claim 13, in which the polymer-propellant-in-organic-liquid emulsion is expelled from an aerosol container by one hand into the other hand, and a foamed structure in the form of an applicator pad is formed in the other hand, ready for use to apply the organic liquid to a surface.

15. A process according to claim 14, in which the organic liquid comprises an additive selected from the group consisting of cosmetic compounds, medicaments, antimicrobial agents, antibiotics, cleaning compounds, polishing compounds and abrasives and mixtures thereof which is deposited with the continuous organic liquid phase in the cells or walls of the structure when the propellant volatilizes, and which can be removed from the cells of the structure.

16. A polymer-propellant-in-organic-liquid emulsion according to claim 1 wherein the liquid propellant is inert to the synthetic polymer; wherein the additive is in liquid or solid form at atmospheric temperature and pressure in an amount in excess of any solubility of the additive in the polymer in the absence of the propellant, the additive being substantially inert to the synthetic polymer and to the propellant, the foamed structure being in a shaped form for immediate use as a pad from which the additive can be removed in liquid form by compression of the pad.

17. A polymer-propellant-in-organic-liquid emulsion according to claim 16 which, upon rapid volatilization of the propellant at atmospheric temperature and pressure, forms a foamed polymeric structure which immediately is non-sticky, coherent, voluminous and self-supporting, which contains the additive, and which is in a shaped form for immediate use as a pad from which the organic liquid and the additive can be removed in liquid form by compression of the pad.

18. A polymer-propellant-in-organic-liquid emulsion according to claim 17 in which the organic liquid contains up to about 20% by weight of a foam-stabilizing agent, in which the composition contains from about 25 to about 60% by weight of the organic liquid phase and the propellant solution contains from about 10% to about 50% by weight of the synthetic polymer.

19. A polymer-propellant-in-organic-liquid emulsion according to claim 18 in which the polymer is dissolved in a liquid comprising, in addition to the liquid propellant, a solvent which has a boiling point above 45°F., the solvent being present in an amount not exceeding two times the weight of polymer and not exceeding the weight of propellant.

20. A polymer-propellant-in-organic-liquid emulsion according to claim 18 in which the polymer is polyisobutyl methacrylate.

21. A process according to claim 14, in which the emulsion comprises an additive, and which comprises the additional step of removing the additive in liquid form from the pad.

22. A process according to claim 21, wherein the propellant is inert to the synthetic polymer, the emulsion comprises an additive that is substantially inert to the polymer and the propellant, in liquid or solid form at atmospheric temperature and pressure, in an amount in excess of any solubility of the additive in the polymer in the absence of the propellant.

23. A process according to claim 16, wherein the organic liquid and the additive are removed in liquid form from the pad by compression of the pad.

24. A process according to claim 22 wherein the organic liquid phase contains up to about 20% by weight of a foam-stabilizing agent, and wherein the composition contains from about 25 to about 60% by weight of the organic liquid phase, and the propellant phase contains from about 10% to about 50% by weight of the synthetic polymer.

25. A process according to claim 24 wherein the polymer is dissolved in a liquid comprising, in addition to the liquid propellant, a solvent which has a boiling point about 45°F., the solvent being present in an amount not exceeding two times the weight of polymer and not exceeding the weight of propellant.

26. A process according to claim 24 wherein the polymer is polyisobutyl methacrylate.

27. A process according to claim 24 wherein the additive is in solution in the organic liquid phase.

28. A process according to claim 24 wherein the additive is dispersed in the organic liquid phase.

29. A process according to claim 24 wherein the additive is dispersed in the propellant phase.

30. A process according to claim 24 wherein the additive is in solution in the propellant phase.

* * * * *

UNITED STATES PATENT OFFICE
CERTIFICATE OF CORRECTION

Patent No. 3,912,665                    Dated October 14, 1975

Inventor(s) Joseph G. Spitzer et al

It is certified that error appears in the above-identified patent and that said Letters Patent are hereby corrected as shown below:

| | | |
|---|---|---|
| [76] Page 1 | : | "Raod " should be --Road-- |
| In the Abstract. line 10 | : | "wit" should be --with-- |
| Column 1, line 43 | : | "in situ" should be --in situ-- |
| Column 1, line 59 | : | "makescellular" should be --makes cellular-- |
| Column 2, line 2 | : | "solutin" should be --solution-- |
| Column 2, line 38 | : | "soltion" should be --solution-- |
| Column 3, line 3 | : | "marix" should be --matrix-- |
| Column 3, line 15 | : | "varietyof" should be --variety of-- |
| Column 4, line 5 | : | "ina" should be --in a-- |
| Column 4, line 15 | : | "thepropellant" should be --the propellant-- |
| Column 4, line 40 | : | "voume" should be --volume-- |
| Column 4, line 47 | : | "andpropellant" should be -- and propellant-- |
| Column 4, lines 62-63 | : | "approximtely" should be --approximately-- |
| Column 4, line 64 | : | "The polymer itself" should begin a new paragraph |
| Column 5, line 5 | : | "aent" should be --agent-- |
| Column 5, line 41 | : | "themechanical" should be --the mechanical-- |

UNITED STATES PATENT OFFICE
CERTIFICATE OF CORRECTION

Patent No. 3,912,665      Dated October 14, 1975

Inventor(s) Joseph G. Spitzer et al

It is certified that error appears in the above-identified patent and that said Letters Patent are hereby corrected as shown below:

| | |
|---|---|
| Column 6, line 14 | : "fore" should be --for-- |
| Column 6, line 28 | : "platicizer" should be --plasticizer-- |
| Column 6, line 54 | : "thepropel" should be --the propel-- |
| Column 7, line 19 | "etane" should be --ethane-- |
| Column 8, line 28 | : "emusion" should be --emulsion-- |
| Column 8, line 40 | : "cna" should be --can-- |
| Column 8, line 57 | : "amunt" should be --amount-- |
| Column 9, line 18 | : "acetyyl" should be --acetyl-- |
| Column 9, line 65 | : "ptasticityof" should be --plasticity of-- |
| Column 10, line 26 | : "deletrious" should be --deleterious-- |
| Column 10, line 53 | : "hexanetril" should be --hexanetriol-- |
| Column 11, line 10 | : "organic" should be --The organic-- and it should start a new paragraph |
| Column 11, line 15 | : "theh" should be --the-- |
| Column 11, line 65 | : "plamitate" should be --palmitate-- |
| Column 12, line 25 | : "ethyl cellulose propyl cellulose" should be --ethyl cellulose, propyl cellulose-- |

UNITED STATES PATENT OFFICE
CERTIFICATE OF CORRECTION

Patent No. 3,912,665      Dated October 14, 1975

Inventor(s) Joseph G. Spitzer et al

It is certified that error appears in the above-identified patent and that said Letters Patent are hereby corrected as shown below:

| | | |
|---|---|---|
| Column 12, line 36 | : | "emulsin" should be --emulsion-- |
| Column 12, line 37 | : | "emulsin" should be --emulsion-- |
| Column 12, line 49 | : | "nt" should be --not-- |
| Column 13, line 20 | : | "Any" should be --An-- |
| Column 13, line 23 | : | "serv" should be --serve-- |
| Column 14, line 48 | : | "ingredieints" should be --ingredients-- |
| Column 18, line 55 | : | "Tabel" should be --Table-- |
| Column 24, line 4 | : | "16" should be --21-- |

Signed and Sealed this eighth Day of June 1976

[SEAL]

Attest:

RUTH C. MASON
Attesting Officer

C. MARSHALL DANN
Commissioner of Patents and Trademarks